United States Patent [19]

Wu

[11] 4,455,382

[45] Jun. 19, 1984

[54] ORGANIC-INORGANIC COMPOSITES OF NEUTRALIZED POLYELECTROLYTE COMPLEXES

[75] Inventor: Shy-Hsien Wu, Horseheads, N.Y.

[73] Assignee: Corning Glass Works, Corning, N.Y.

[21] Appl. No.: 461,672

[22] Filed: Jan. 27, 1983

[51] Int. Cl.$^3$ .............................. C03C 3/22; C09C 1/02
[52] U.S. Cl. .......................................... 501/2; 106/291;
  106/306; 106/308 M; 106/308 Q; 106/DIG. 3;
  162/100; 428/363; 501/3; 501/4; 501/5;
  501/12; 501/36; 501/151; 501/154; 524/449
[58] Field of Search .......................... 501/2, 3, 4, 5, 36,
  501/151; 106/291, 308 M, 308 Q, 306, DIG. 3;
  524/449

[56] References Cited

U.S. PATENT DOCUMENTS 4,167,423  9/1979  Williams .............................. 106/306
4,239,519 12/1980  Beall et al. ............................. 501/3
4,341,824  7/1982  LeGrand ........................ 106/308 M Primary Examiner—Helen M. McCarthy
Attorney, Agent, or Firm—C. S. Janes, Jr.

[57] ABSTRACT

This invention is directed to the preparation of neutralized polyelectrolyte complexes exhibiting hydrophobic behavior containing crystals of an organic polycation exchanged lithium and/or sodium water-swelling mica. The process for making such products comprises:

(1) forming a glass-ceramic body containing crystals selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite;

(2) contacting that body with a polar liquid to cause swelling and disintegration of the body accompanied with the formation of a gel; and (3) contacting said gel with a source of organic polycations to cause a reaction between the Li$^+$ and/or Na$^+$ ions from the interlayer of the crystals and to neutralize the charge density of the crystals, thereby forming neutralized polyelectrolyte complex, said organic polycations being selected from the group of (a) a primary amine solubilized with acid,
(b) a secondary amine solubilized with acid,
(c) a tertiary amine solubilized with acid,
(d) a quaternary ammonium acid salt,
(e) a quaternary phosphonium acid salt, and
(f) a ternary sulfonium acid salt.

3 Claims, No Drawings

ORGANIC-INORGANIC COMPOSITES OF NEUTRALIZED POLYELECTROLYTE COMPLEXES

BACKGROUND OF THE INVENTION

U.S. Pat. No. 4,239,519 is directed to the preparation of inorganic, crystal-containing gels and papers, fibers, films, boards, and coatings produced therefrom. The method for making the precursor gels involves three fundamental steps: (a) a fully or predominantly crystalline body is formed which contains crystals consisting essentially of a lithium and/or sodium water-swelling mica selected from the group of fluorhectorite, hydroxyl hectorite, boron fluorphlogopite, hydroxyl boron phlogopite, and solid solutions between those and other structurally-compatible species selected from the group of talc, fluortalc, polylithionite, fluorpolylithionite, phlogopite, and fluorphlogopite; (b) that body is contacted with a polar liquid, normally water, to cause swelling and disintegration of the body accompanied with the formation of a gel; and (c) the solid:liquid ratio of the gel is adjusted to a desired value depending upon the application therefor. Glass-ceramics are the preferred crystalline starting bodies.

To impart good chemical durability to papers, films, fibers, boards, and coatings prepared from the gels, those products are contacted with a source of large cations to cause flocculation of the gel and an ion exchange reaction to take place between the large cations and the $Li^+$ and/or $Na^+$ ions from the interlayer of the crystals, and then washed and dried. As illustrative of large cations operable in that ion exchange reaction, the patent cites $K^+$, $Rb^+$, $Cs^+$, $NH_4^+$, $Cu^+$, $Ag^+$, $H_3O^+$, $Ca^{+2}$, $Sr^{+2}$, $Ba^{+2}$, $Pb^{+2}$, and certain organic polycations, e.g., aniline hydrochloride and quaternary ammonium compounds. If desired, the ion exchange reaction may be undertaken with the gel, i.e., before a paper, fiber, film, board, coating, or other product is made, or during the process for actually forming the product. In any event, wherever the ion exchange step is conducted in the stream of production, its occurrence is mandatory to preclude spontaneous disintegration of the products in the presence of water.

Long term testing of products made in accordance with the disclosure of that patent has indicated that the values of such physical properties as mechanical strength, flexibility, dielectric strength, loss tangent, and ionic conductivity are influenced by the relative humidity of the surrounding environment. Stated differently, the properties displayed by the products are not stable. In the main, there is an overall deterioration in the mechanical and electrical properties as the relative humidity of the atmosphere is increased.

Consequently, the primary objective of the instant invention is to devise means for rendering papers, films, boards, fibers, and coatings prepared in accordance with the disclosure of U.S. Pat. No. 4,239,519, supra, relatively insensitive to the relative humidity of the environment in which the product will be used.

SUMMARY OF THE INVENTION

It is well recognized in the organic polymer field that neutralized polyelectrolyte complexes formed through the reaction of polycations with polyanions exhibiting equivalent charges will resist water swelling, i.e., will demonstrate little water sorption. That phenomenon is postulated to be due to a tight, neutralized, polyionic interaction.

The present invention is founded in the discovery of a new composite material, viz., a neutralized polyelectrolyte complex, which, when fabricated in the form of paper, film, fiber, board, or coating, possesses such desirable physical characteristics as excellent hydrophobicity, remarkable toughness, high dielectric constant, high electrical resistivity, and high mechanical strength, can be prepared by reacting an equivalent amount of an organic polycation with an anionic gel produced in the manner disclosed in U.S. Pat. No. 4,239,519, supra.

For example, paper made from a neutralized polyelectrolyte complex via a Fourdrinier-type process can demonstrate good dry strength, substantial wet strength, and excellent water repellency. However, the most exceptional property manifested by the paper was the substantial insensitiveness of the loss tangent thereof to exposure to different surrounding relative humidity conditions. The paper can also exhibit very high dielectric strengths and dielectric constants which are stable in atmospheres of varying relative humidities.

Board prepared in accordance with the inventive process can display high strength coupled with remarkable toughness. Examples thereof can be nailed without showing cracking and evidence good dry and wet strength, water repellency, high surface resistivity, and are essentially non-flammable, i.e., they will not flare, but merely char, when contacted with a flame.

Finally, dense, non-porous coatings which display excellent water repellency can be formulated which, because of their inherent high mechanical strength and surface hardness, can be useful in protecting weak and-/or friable substrate materials.

Whereas ion exchange of an organic polycation with an anionic gel was briefly mentioned in U.S. Pat. No. 4,239,519, no indication was made therein to achieving charge neutrality in the exchanged system. Yet, charge neutrality comprises the cornerstone of the inventive composite material. Hence, each of the exceptional and desirable properties demonstrated by the inventive materials is a direct consequence of organic polycations reacting strongly with an equivalent amount of inorganic polyanions (gels) to form a neutralized polyelectrolyte complex. Any substantial deviation from charge neutrality renders the resulting polyelectrolyte complex systems, i.e., the composite materials, essentially useless because of their high susceptibility to a swelling action in the presence of moisture (water).

In the most general terms, the preparation of the inventive materials contemplates three fundamental steps:

(1) a glass-ceramic body is produced according to the method and having an overall composition and microstructure disclosed in U.S. Pat. No. 4,239,519;

(2) said glass-ceramic body is contacted with a polar liquid, commonly water, for a time sufficient to cause swelling and disintegration thereof accompanied with the formation of a gel containing crystals; and (3) said gel is contacted with a source of organic polycations in an amount and for a time sufficient to cause an ion exchange reaction to occur between the organic polycations and the $Li^+$ and/or $Na^+$ ions from the interlayer of said crystals and to neutralize the charge density of said crystals, thereby effecting the formation of neutralized polyelectrolyte complex.

Where paper, film, fiber, board, or coating is desired, the neutralized polyelectrolyte complex will be dispersed into a liquid vehicle; the solid:liquid ratio of the complex and vehicle will be adjusted to a proper value for the formation of a paper, board, film, fiber, or coating; and then paper, board, film, fiber, or coating will be made therefrom.

Because the neutralized polyelectrolyte complex exhibits hydrophobic behavior, water alone is not suitable as a dispersing solution. Laboratory investigations indicated that polar organic liquids such as short chain aliphatic acids, alcohols, aldehydes, and amides could be utilized for that function. It was also found that aqueous salt solutions of such large cations as $K^+$, $Rb^+$, $Cs^+$, $NH_4^+$, $Ca^{+2}$, $Sr^{+2}$, $Cu^+$, $Ag^+$, $Ba^{+2}$, and $Pb^{+2}$ were also suitable as were aqueous $NH_4OH$ solutions. Formamide has been deemed to be the preferred liquid organic dispersing solution and aqueous solutions of $KCl$ and $NH_4OH$ as the preferred inorganic dispersants.

Generally, there are three categories of organic cations, viz., $N^+$, $P^+$, and $S^+$, each of which is operable in the inventive process. The most common of those is $N^+$, of which there are four types:

(a) a primary amine solubilized with acid, exemplified by $$R-NH_3^+X^-$$

(b) a secondary amine solubilized with acid, exemplified by

(c) a tertiary amine solubilized with acid, exemplified by

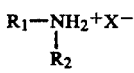

(d) a quaternary ammonium acid salt, exemplified by

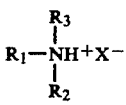

The cationic characteristic increases from the primary amine up to the quaternary cation.

The $P^+$ cation is illustrated by the quaternary phosphonium acid salt

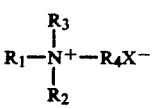

The $S^+$ cation is exemplified by the ternary sulfonium acid salt

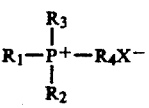

The above-recited nonpolymeric cations are known to react, i.e., ion exchange, with anionic clay materials. Because of the strong anionic character of the gels derived from U.S. Pat. No. 4,239,519, the amount of organic polycation required as an effective and complete counterbalance so as to yield stable flocs is dependent upon the charge strength thereof. Hence, a larger quantity of a primary amine solubilized with an acid will be necessary to balance the anionic charge of the gels than of a quaternary ammonium salt.

In summary, the present invention provides a method for preparing a neutralized polyelectrolyte complex containing relatively uniformly-sized crystals consisting essentially of an organic polycation-exchanged lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, at least a substantial proportion of said crystals exhibiting a morphology of a continuum of flakes, rectangular-like strips, and interwoven ribbons in parallel or sub-parallel zones or sheaths. Commonly, the strips and ribbons will be about 0.5–10 microns in length, about 500Å–5000Å wide, and less than about 100Å thick, and the flakes will be irregularly shaped with diameters between about 0.5–10 microns and cross sections of less than about 100Å.

In specific terms, the inventive method involves three basic steps:

(1) a glass-ceramic body is formed containing relatively uniformly-sized crystals consisting essentially of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite;

(2) said body is contacted with a polar liquid for a time sufficient to cause swelling and disintegration thereof accompanied with the formation of a gel, at least a substantial portion of the crystals in the gel exhibiting the above-described morphology of a continuum of flakes, rectangular-like strips, and interwoven ribbons in parallel or subparallel zones or sheaths; and (3) said gel is contacted with a source of organic polycations for a time sufficient to cause an ion exchange reaction to occur between the organic polycations and the $Li^+$ and/or $Na^+$ ions from the interlayer of said crystals and to neutralize the charge density of said crystals, thereby effecting the formation of neutralized polyelectrolyte complex.

Paper, board, fiber, film, or coating is produced via three additional steps:

(1) said complex is dispersed into a liquid selected from the group of polar organic liquids, aqueous $NH_4OH$ solutions, and aqueous salt solutions of large cations selected from the group of $K^+$, $Rb^+$, $Cs^+$, $NH_4^+$, $Ca^{+2}$, $Sr^{+2}$, $Cu^+$, $Ag^+$, $Ba^+$, and $Pb^{+2}$;

(2) the solid:liquid ratio of the complex and liquid is adjusted to a desired fluidity, and (3) a paper, board, fiber, film, or coating is prepared therefrom.

The paper, board, fiber, film, and coating (after application to a substrate) are dried and cured by heating to slightly elevated temperatures, i.e., temperatures above room temperature, but normally not in excess of 200° C. and, most commonly, at temperatures below 150° C.

Glass-ceramic bodies consisting essentially, expressed in weight percent on the oxide basis, of

| | |
|---|---|
| $Li_2O$ | 0-12 |
| $Na_2O$ | 0-10 |
| $Li_2O + Na_2O$ | 0.5-14 |
| MgO | 10-38 |
| $B_2O_3$ | 0-30 |
| $Al_2O_3$ | 0-10 |
| $SiO_2$ | 35-70 |
| F | 0-15 |
| OH | 0-15 |
| F + OH | 4-15 | are operable in the inventive method with the preferred compositions consisting essentially, expressed in weight percent on the oxide basis, of

| | |
|---|---|
| $Li_2O$ | 0.5-12 |
| $Na_2O$ | 0-10 |
| $Li_2O + Na_2O$ | 0.5-14 |
| MgO | 14-38 |
| $B_2O_3$ | 0-15 |
| $Al_2O_3$ | 0-10 |
| $SiO_2$ | 35-70 |
| F | 5-15 |

Customarily, water will constitute the polar liquid utilized to cause gel formation, although polar organic liquids can be operable. In general, the time required to effect swelling, disintegration, and gelation ranges between about 1-48 hours.

RELATED PATENT APPLICATION

U.S. patent application Ser. No. 461,571, filed concurrently herewith by S. N. Hoda and A. R. Olszewski and entitled ORGANIC-INORGANIC COMPOSITES CONTAINING SYNTHETIC MICA, discloses the production of composite articles demonstrating hydrophobic behavior by contacting a gel prepared in accordance with U.S. Pat. No. 4,239,519 with a source of organic cations to cause an ion exchange reaction to take place between the organic cations and the interlayer $Li^+$ and/or $Na^+$ ions of the crystals. The operable organic cations are selected from the group of aminosilanes and organic chrome complexes.

DESCRIPTION OF PREFERRED EMBODIMENTS

In the following illustrative examples, gel prepared from Example 14 of U.S. Pat. No. 4,239,519 (the preferred composition of that patent), and in accordance with the method described in that patent, constituted the precursor material. Thus, a glass body having the following approximate composition, expressed in terms of weight percent on the oxide basis as calculated from the batch, of

| | |
|---|---|
| $SiO_2$ | 64.5 |

| -continued | |
|---|---|
| MgO | 10.8 |
| $Li_2O$ | 8.0 |
| $MgF_2$ | 16.7 | was heat treated at about 700° C. for about four hours to form a highly crystalline body containing fluorhectorite as the predominant crystal phase. The body was immersed into deionized water whereupon it swelled, disintegrated, and formed a gel. After occasional stirring, the material was permitted to settle and the gel decanted, leaving any residual glass and non-micaceous phases, if present. The viscosity of the decanted portion was then adjusted to a predetermined viscosity in preparation for further use.

In carrying out the present invention, preparation of neutralized polyelectrolyte complex from the above gel was undertaken in the following manner. 600 grams of gel (8.42% solids content) were added slowly into 1000 grams of KYMENE 557H solution (6.25% solids content) accompanied with vigorous stirring. KYMENE 557H, marketed by Hercules, Incorporated, Wilmington, Del., comes within the category of a quaternary ammonium acid salt and can be described as a cationic, water soluble condensate of a basic polyamide and epichlorohydrin which has assumed a polyamide-polyamine-epichlorohydrin resin form. Flocs of neutralized polyelectrolyte complex are developed essentially instantaneously. The coarse flocs were sheared further via a two-minute residence in a Waring blender operating at high speed. The flocs were thereafter subjected to moderate stirring for six hours and then allowed to separate overnight. The resultant slurry consisted of fine flocs settled at the bottom overlaid with a cloudy supernatant solution. The supernatant solution was decanted off and discarded. The separated fine flocs were washed by running into distilled water, stirring for 10 minutes, and then filtering. This washing was repeated several times to insure complete removal of excess KYMENE. The yield of the final wet floc was about 120 grams having a solids content of about 33% by weight.

The amount of organic polycations present in the final product is governed by the requirement of charge neutrality in the neutralized polyelectrolyte complex system. Hence, where the precursor gel is insufficiently separated, the result is a relatively low charge density. For example, where the gel is subjected to conventional ball milling techniques, the fluorhectorite flakes are not sufficiently separated and the isoelectric point of the system can be reached at a KYMENE 557H addition level of about 15% by weight, based upon the amount of fluorhectorite solids. However, in a highly sheared gel the isoelectric point will be at a much higher KYMENE level. Thus, the flakes of fluorhectorite in a highly sheared gel are so well separated as to assume a relatively high charge density, thereby demanding a large quantity of polycations to attain the isoelectric point. To illustrate, a nitrogen analysis of the flocs described above indicated a KYMENE content of about 36% by weight, based upon total solids, or about 56% by weight, based upon the fluorhectorite solids. Evidently, the flakes of fluorhectorite in a highly sheared gel are very well separated and, thus, assume a relatively high charge density. That condition requires a large level of polycations to achieve the isoelectric point.

Laboratory experience has indicated that the rate of ion exchange between an organic polycation and the gel is considerably slower than that occurring between a cation such as K+ and the gel. Consequently, to insure the greatest extent of exchange, an excess of KYMENE 557H is used for neutralization and a relatively long time for the reaction to take place is utilized. The excess KYMENE is removed by subsequent successive washings and filterings of the slurry. The initial filtering step may require as long as two hours to complete; whereas after several washings and filterings, the time therefor can be measured in seconds. The rapid filter rate indicates the essentially total removal of excess KYMENE and illustrates the substantial hydrophobic character of the complex. It is this hydrophobic behavior which imparts the exceptionally good stability of mechanical and electrical properties to the inventive products when in contact with environments of varying relative humidities.

The neutralized polyelectrolyte complexes exhibit two distinct properties, viz., they release water easily and they demonstrate a combination of toughness and hardness. For example, relatively light pressure with a finger can cause wet flocs thereof to lose water and to assume a very compact form which is tough and hard, but not brittle. It is believed that the strong and complete polycation-polyanion interaction (KYMENE-gel) replaces the original affinity of the KYMENE or the gel toward water. Therefore, the resulting flocs do not readily adsorb or absorb water. Furthermore, the polymeric characteristics of KYMENE impart toughness to the product.

The hydrolytic stability of the complexes was investigated by immersion into water at ambient temperature for seven days. A comparison or control floc prepared utilizing K+ ions as the flocculating agent was also immersed into water for the same period of time. The latter rapidly disintegrated, whereas the inventive complex exhibited little attack.

The inventive materials were also cast as films onto glass slides to evaluate the water repellency quality thereof, this characteristic being a function not only of the intrinsic hydrophobic nature of the complexes, but also the smoothness and tightness of the cast films. The films demonstrated exceptional water repellency as evidenced by water beading for one hour. Such excellent film formation is a result of the polycations manifesting high interfloc affinity or cohesive strength.

The water repellency exhibited by the inventive films can be further improved via a post treatment with a silane solution. For example, methanol solutions were prepared containing 0.1%, 0.5%, 1.0%, and 5% by weight, respectively, of Z-6032 silane, marketed by Dow Corning Corporation, Midland, Mich., and designated as N-$\beta$-(N-vinylbenzylaminoethyl)-$\gamma$-aminopropyltrimethoxysilane.Hydrogenchloride. Films of the inventive flocs were prepared on glass slides, the coated slides contacted with the silane solutions, and thereafter the silane was cured by sequentially heating for one hour at 100° C. followed by one hour at 120° C. Even at only the 0.1% solution concentration, the silane-coated films displayed water beading after soaking overnight in water at ambient temperature. However, to insure even greater resistance to attack by moisture, a 0.5% silane solution concentration has been deemed preferred. Whereas some further improvement may be evidenced at higher solution concentrations, 5% has been deemed a practical maximum. The curing temperatures will be maintained below about 200° C.

Post treatment of films in like manner with methanol solutions containing 0.5% by weight, respectively, of A-174 and A-187 silanes marketed by Union Carbide, New York, New York, again evidenced exceptional resistance to moisture attack after an overnight immersion in water at ambient temperature. A-174 is designated as $\gamma$-Methacryloxypropyl-trimethoxysilane and A-187 is designated as $\gamma$-Glycidoxypropyltrimethoxysilane.

The cohesive strength of the inventive materials is dependent upon the charge nature of both the polyvalent cations and anions, i.e., the density and strength of the charge exhibited thereby, and the molecular characteristics thereof, i.e., such properties as steric hindrance and molecular weight. The quaternary ammonium acid salts appear to yield products displaying the greatest cohesive strength.

As has been observed above, three types of liquid media have been found operable to uniformly redisperse the neutralized polyelectrolyte complex preparatory to making paper, board, fiber, film, or coating; viz., certain polar organic liquids such as short chain aliphatic acids, alcohols, aldehydes, and amides, aqueous NH$_4$OH solutions, and aqueous salt solutions of a large cation. A particularly useful solution of the latter contains K+ ions. Laboratory investigations utilizing aqueous solutions of KCl (0.005-2N) have pointed to two significant features arising from the use thereof: (1) KCl solutions can depress double layers of polyionic interaction thereby weakening it to permit water to diffuse and penetrate between polyions for better dispersion; and (2) K+ ions can be utilized as a scavenger to ion exchange with any residual fluorhectorite sites which were inaccessible to the organic polycations because of steric hindrance, thereby completing fully the exchange process.

Contact with an aqueous NH$_4$OH solution causes a KYMENE-treated product to swell. This phenomenon is of very practical significance since the observed affinity of NH$_4$OH toward KYMENE causes flocs of the inventive complexes to swell which, in turn, renders them more easily broken down into very finely-divided particles under a dispersing condition of high shear.

ACCOSTRENGTH 711, marketed by American Cyanamid Company, Wayne, N.J., and NALCOLYTE 7134, marketed by Nalco Chemical Company, Chicago, Ill., are other polyquaternary ammonium salts which, when utilized in the manner described above with respect to KYMENE, also yield products exhibiting like characteristics.

PREPARATION OF PAPER

About 1.3 grams of the neutralized polyelectrolyte KYMENE complex were dispersed into 50 grams of formamide utilizing a 10-minute residence in a Waring blender operating at high speed. The resultant slurry was diluted through the addition of 50 grams of distilled water accompanied with moderate stirring and then poured into a Britt jar (a laboratory scale papermaking device utilizing a Fourdrinier-type process). A uniform wet web was formed over a piece of stainless steel screen (200 mesh—74 microns) inside the jar after applying a vacuum suction for five minutes. The web and the screen were dried for about 15 minutes at 80° C. to facilitate separation of the partially dried web from the screen.

The web was thereafter immersed for two hours into an aqueous 2N KCl solution to effect further ion exchange, if necessary, to insure the essential absence of Li+ ions in the product. The web was washed twice in distilled water and then dried (cured) for 30 minutes each at 80° C., 100° C., and 120° C. The dried paper sheet, circular with a diameter of about 4" and a thickness of about 0.0025", demonstrated a smooth surface and appeared to be free from pin holes.

In another method for preparing paper, 1.3 grams of the neutralized polyelectrolyte KYMENE complex were dispersed into 200 grams of an aqueous 0.05 N KCl solution employing a 15-minute residence in a Waring blender operating at high speed. The slurry produced thereby was passed through a stainless steel screen (100 mesh—149 microns) to remove any oversize flocs and then 400 grams of distilled water were admixed therewith. The diluted slurry was poured into a Britt jar and subjected to a brief mild stirring. The slurry was allowed to stand for one hour in the Britt jar to insure the formation of a uniform web over the 200 mesh stainless steel screen before vacuum suction was applied to remove the liquid therefrom. Drying for 15 minutes at 80° C. permitted ready separation of the web from the screen. The web was subsequently washed twice in distilled water and dried (cured) for 30 minutes each at 80° C., 100° C., and 120° C. The resultant dried paper disc had a thickness of about 0.0012", exhibited a smooth surface, had a uniform appearance, and seemed to be free from pin holes.

Variations on the above method were conducted utilizing aqueous KCl solutions having concentrations of 0.5 N, 0.1 N, 0.01N, and 0.005N. Where solutions of low KCl concentrations were employed, viz., 0.01N and 0.005N, the neutralized polyelectrolyte complex slurry was quite coarse, thereby leading to poor paper quality. It was found, however, that the addition of a small amount of aqueous $NH_4OH$, e.g., 0.05 cc of 20% by weight $NH_4OH$, to the coarse slurries with low KCl concentrations would result in the production of good uniform paper. Moreover, the neutralized polyelectrolyte complex in the $NH_4OH$-containing solution displayed a slight amount of elasticity, posited to be due to some swelling, and the paper derived therefrom appeared to be much smoother than that prepared from $NH_4OH$-free solution.

The above papers prepared with or without $NH_4OH$ additions displayed a dry strength comparable to paper made via the same process, but utilizing K+ ions for dispersion. Moreover, the papers exhibited excellent water repellency and substantial wet strength after an overnight immersion in water, whereas the K+ ion paper absorbed water very readily and manifested essentially no wet strength.

Typical electrical properties of papers prepared in accordance with the above description wherein K+ ions constitute the dispersing agent are recorded below in Table I.

TABLE I

| | 120 Hz | 1 KHz | 10 KHz |
|---|---|---|---|
| Dielectric Constant | | | |
| 25° C. | 16.63 | 16.12 | 15.36 |
| 52° C. | 18.18 | 17.37 | 16.61 |
| 79° C. | 22.27 | 19.99 | 18.53 |
| 128° C. | 34.65 | 27.60 | 22.72 |
| 161° C. | 42.44 | 29.95 | 31.80 |
| 206° C. | 57.42 | 36.20 | 26.43 |
| Loss Tangent | | | |

TABLE I-continued

| | 120 Hz | 1 KHz | 10 KHz |
|---|---|---|---|
| 25° C. | 0.0210 | 0.0270 | 0.0400 |
| 52° C. | 0.0400 | 0.0320 | 0.0400 |
| 79° C. | 0.1100 | 0.0700 | 0.0520 |
| 128° C. | 0.4300 | 0.2300 | 0.1300 |
| 161° C. | 0.4500 | 0.3100 | 0.1800 |
| 206° C. | 0.7500 | 0.4700 | 0.2800 |
| Electrical Resistivity | | | |
| Log ρ 25° C. | — | | |
| Log ρ 52° C. | — | | |
| Log ρ 79° C. | 13.16 | | |
| Log ρ 128° C. | 11.91 | | |
| Log ρ 161° C. | 10.91 | | |
| Log ρ 206° C. | 8.37 | | |

Those data clearly indicate that the papers would be suitable for low temperature electrical applications only (≦150° C.). The loss tangent of 0.02 at room temperature and 120 Hz is relatively low, but still not sufficiently low to be operable in capacitor applications. Nevertheless, both the electrical resistivity and the dielectric constant are desirably high. It is postulated that a very limited number of water molecules are essentially fixed within the matrix structure, the presence of such molecules and the extremely tight bonding thereof within the matrix giving rise to the high dielectric constant and high dielectric strength displayed by the inventive papers.

The most interesting characteristic of the inventive papers is the relative insensitivity of the electrical properties thereof to ambient moisture. That feature is illustrated in Table II below, which reports loss tangent measurements conducted at room temperature (25° C.) at 0% relative humidity and at 46% relative humidity. As can be seen therein, the loss tangent is substantially unaffected by changes in relative humidity.

TABLE II

| | 0% Relative Humidity | 46% Relative Humidity |
|---|---|---|
| 120 Hz | 0.017 | 0.0195 |
| 1 KHz | 0.021 | 0.021 |
| 10 KHz | 0.026 | 0.026 |

Finally, high values have been determined for the dielectric strength demonstrated by the inventive papers, e.g., >1000 volt/mil for A.C. at 60 Hz and ~1600 volt/mil for D.C. at 70% relative humidity.

PREPARATION OF BOARD

About 13 grams of the neutralized polyelectrolyte KYMENE complex were dispersed into 117 grams of an aqueous 0.1N KCl solution utilizing a 10-minute residence in a Waring blender operating at high speed. The resultant slurry was vacuum filtered over a period of three hours into a plastic mold having base dimensions of 2⅝"×154" to form a bar-shaped wet cake. The cake was washed in distilled water overnight to extract excess KCl and then placed under weight for 40 hours in a vacuum to remove water. Thereafter, the cake was pressed for one minute in a metal die under a pressure of 2500 psi and subsequently cured by exposure for two hours each at 80° C., 100° C., and 120° C. The pressed board (bar) was smooth and flat with dimensions of 2 9/16"×⅜"×5/32" and a weight of about four grams. Aqueous solutions of 0.05 N, 1 N, and 2 N KCl were also found to be effective in producing such boards.

The bar-shaped boards displayed smooth surfaces and were hard but not brittle. The boards could be nailed without cracking and would not burn, but only char, when contacted with the flame of a match (~600° C.). Furthermore, the boards exhibited excellent water repellency and good wet strength, the latter property being essentially unaffected after overnight immersion in water.

The combination of toughness and hardness characteristic of the inventive materials is evidenced by an elastic modulus measurement of $1.6 \times 10^6$ psi and a modulus of rupture measurement of 6000 psi. Also, a fracture strain of about 2.1% was determined which is significantly greater than that displayed by pine wood.

PREPARATION OF COATINGS

Two portions of gel prepared from Example 14 of U.S. Pat. No. 4,239,519 were neutralized with KYMENE 557H solution in the manner described above, but wherein the first portion was centrifuged continuously at 1200 rpm and the second portion was centrifuged continuously at 9000 rpm. Thereafter, 18.7 grams of the first portion of the neutralized complex and 6.3 grams of the second portion were redispersed in 475 grams of an aqueous 0.01N KCl solution via a five-minute residence in a Waring blender operating at high speed. The resulting slurry was then utilized for coating foamed glass blocks having surface dimensions of $6'' \times 6''$.

The coating procedure comprised two steps: (a) filling the cell voids gradually; and (b) building up the overlaying coating quickly. Hence, initially, the foam cells were slowly filled through five successive applications of slurry, about 30 grams of slurry in each application with a 1.5 hour ambient air drying period intermediate the applications. After the cells were deemed full, a surrounding coating was relatively quickly built up via four applications of larger amounts of slurry, viz., about 90 grams of slurry in each case, with a 2-hour ambient air drying period between successive applications. The coated blocks were allowed to dry overnight in the ambient environment and then cured for two hours each at 80° C., 100° C., and 120° C. The final coating was relatively smooth and hard with a thickness of about 0.007" and a coating weight of about 0.22 grams/in$^2$.

In a modification of the above-described practice, a layered coating was prepared on the foamed glass blocks. Instead of utilizing the mixed slurry described above, the cells were filled through successive applications of the first portion (slurry prepared via centrifuging at 1200 rpm) and an enveloping coating prepared therefrom through two applications of larger amounts of that slurry. Thereafter, two applications of the second portion (slurry prepared via centrifuging at 9000 rpm) were made superjacent to the enveloping coating and the blocks then dried and cured.

The inventive coatings are exceptionally useful in that they have the capability of coalescing and being cured to form a thin, hard, tough, water-repellent, smooth, essentially pin hole-free film without pressing. Consequently, the coatings can provide physical protection for the fragile cell structure of foamed glass blocks. If desired, conventional paints (preferably oil-based) can be applied over the coatings since the coatings are very compatible therewith.

Neutralization of the above gel was also carried out utilizing a quaternary phosphonium acid salt, viz., tetra-N-butyl phosphonium chloride. The process involved slowly adding 60 grams of gel (8.42% solids content) into 100 grams of the chloride (12.5% solids content) with constant stirring. Very fine, fluffy flocs of neutralized polyelectrolyte complex formed virtually instantaneously. The flocs were consolidated by precipitating in acetone (four volumes), filtered, and dried (cured) at 120° C. for two hours.

The water repellency of the product in film form was inferior to that prepared from KYMENE 557H. This decrease in cohesive strength exhibited in the floc is considered to be due to the intrinsic differences in molecular characteristics and in charge density and strength existing between quaternary phosphonium acid salts and quaternary ammonium acid salts.

Two gels were prepared having lower charge densities than that of the above-described Example 14 of U.S. Pat. No. 4,239,519 to study the effect of anionic charge density upon the properties of neutralized polyelectrolyte complexes resulting from reacting such gels with the organic polycation KYMENE 557H. The precursor glass bodies had the following approximate compositions, expressed in terms of weight percent on the oxide basis as calculated from the batch, of

|         | A    | B    |
|---------|------|------|
| $Li_2O$   | 3.9  | 2.8  |
| $Na_2O$   | 2.6  | 2.1  |
| MgO     | 13.0 | 15.2 |
| $MgF_2$   | 17.8 | 22.1 |
| $SiO_2$   | 62.7 | 57.8 |

Example A was calculated to have about ⅔ and Example B about 1/3, respectively, the charge density of Example 14 referred to above.

The glass bodies were heat treated to convert them into glass-ceramic bodies containing fluorhectorite as the predominant crystal phase and those bodies immersed into deionized water to form a gel in like manner to the description above with respect to Example 14.

Neutralization of gel in Example A was undertaken in the following manner. 722 grams of gel (7% solids content) were added slowly into 1000 grams of KYMENE 557H solution (6.25% solids content) with vigorous stirring. Flocs of neutralized polyelectrolyte complex formed substantially instantaneously which were subsequently sheared, washed, and filtered similarly to the treatment discussed above with regard to gel of Example 14. Neutralization of Example B was carried out in a similar manner to Example A with 574 grams of gel (8.8% solids content) being combined with 1000 grams of KYMENE 557H solution (6.25% solids content).

The amount of KYMENE present in the flocs, as determined via nitrogen analysis in terms of weight percent, were:

| Example 14 | 35.6% |
|------------|-------|
| Example A  | 35.2% |
| Example B  | 31.1% |

It is evident from those values that, although the charge density of Example B is calculated to be but about ⅓ that of Example 14, there was only a small difference observed in the amount of KYMENE picked up. The water repellencies of Examples A and B in film form were very good, Example B being slightly less favorable than Example A.

Examples A and B could be readily processed in the form of boards or bars. Mechanical properties measured on bar-shaped samples of Example B having the approximate dimensions 2 19/32"×⅜"×5/32" are reported below in comparison with KYMENE-treated gel of Example 14 (MOR=Modulus of Rupture in psi, MOE=Modulus of Elasticity in $10^6$ psi, and F.S.=Fracture Strain in %):

|  | MOR | MOE | F.S. |
|---|---|---|---|
| Example B | 2880 | 1.02 | 1.3 |
| Example 14 | 8190 | 1.91 | 2.88 |

The above data reinforced the above observation that the Example 14 - KYMENE 557H neutralized polyelectrolyte complexes provide hard, strong (MOR ~8000 psi), yet very tough (fracture strain ~3%) materials. However, when the anionic charge of the fluormica-containing starting material is reduced, the final product is weaker and less tough. This circumstance is believed to be the result of a loss of cohesive strength among the flocs.

In summary, whereas a lesser amount of the organic polycations can be utilized by decreasing the charge density of the gel, that action results in a substantial depreciation in the mechanical properties of the final product. Furthermore, properties such as water repellency and bulk mechanical strength are closely related to the inherent cohesive strengths of the flocs which, in turn, is governed by the charge nature (density and strength) and molecular characteristics, such as molecular weight and steric hindrance, of both the polyanion (gel) and the organic polycation.

I claim:

1. Flocs of a neutralized polyelectrolyte complex exhibiting hydrophobic behavior containing relatively uniformly-sized crystals and consisting essentially of an organic polycation-exchanged lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, at least a substantial portion of said crystals exhibiting a morphology of a continuum of flakes, rectangular-like strips, and interwoven ribbons in parallel or sub-parallel zones or sheaths, wherein said strips and ribbons are about 0.5–10 microns in length, about 500Å–5000Å in width, and less than 100Å in thickness, and said flakes are irregularly shaped with diameters between about 0.5–10 microns and cross sections of less than about 100Å, and said organic polycation being a water soluble condensate of a basic polyamide and epichlorhydrin which has assumed a polyamide-polyamine-epichlorhydrin resin form.

2. A complex according to claim 1 in the form of paper, board, film, fiber, or coating exhibiting high strength, good toughness, essential non-flammability, excellent water repellency, high electrical resistivity, and high dielectric constant, the electrical properties thereof being substantially insensitive to changes in relative humidity.

3. Paper, board, film, fiber, or coating according to claim 2 having a silane coating thereon for improved water repellency.

* * * * *